Nov. 6, 1951  
L. C. RUBIN  
2,573,730  
PROCESS OF SULFATING OLEFINS  
Filed March 15, 1948
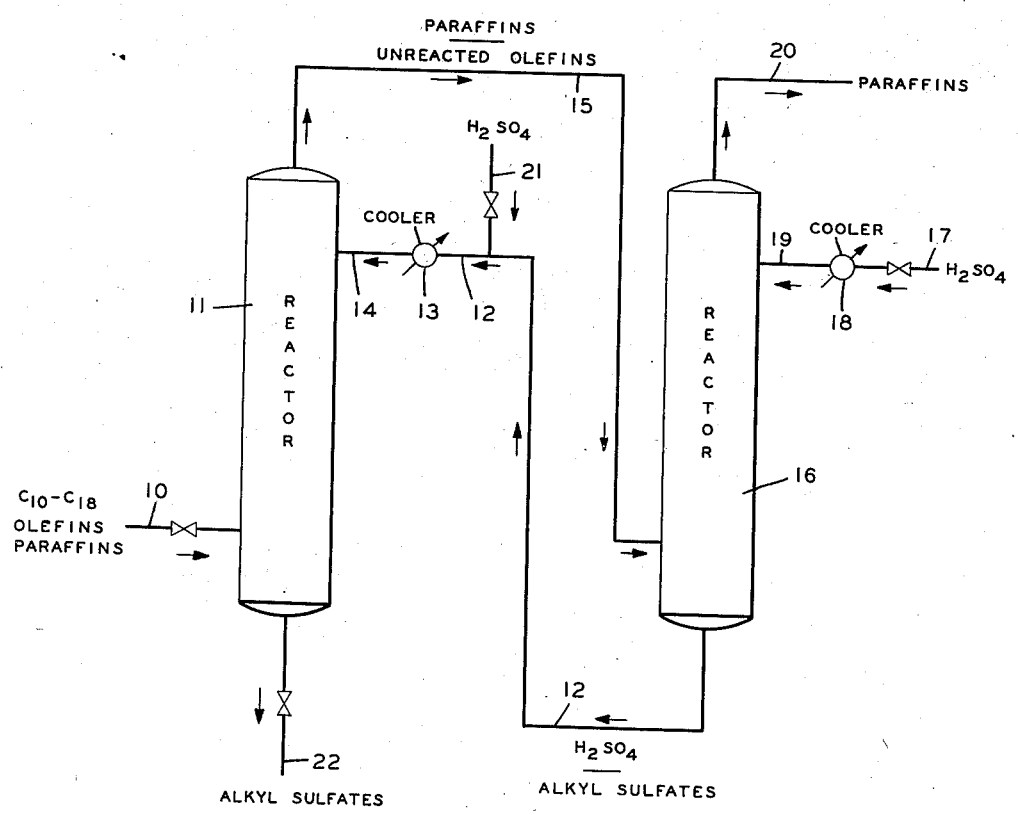
INVENTOR.  
LOUIS C. RUBIN  
BY  
E. F. Liebrecht  
Benjamin J. Kaufman  
ATTORNEYS Patented Nov. 6, 1951

2,573,730

UNITED STATES PATENT OFFICE 2,573,730

PROCESS OF SULFATING OLEFINS

Louis C. Rubin, West Caldwell, N. J., assignor to
The M. W. Kellogg Company, Jersey City, N. J.,
a corporation of Delaware Application March 15, 1948, Serial No. 14,995

10 Claims. (Cl. 260—460)

This invention relates to improved detergent compositions and the process of preparing them. More particularly, the invention relates to a process of preparing detergent compositions in the form of sulfonation products from straight-chain olefins having from 10 to 18 carbon atoms per molecule. Still more particularly, the invention relates to a process of preparing detergent compositions in the form of sulfonation products from straight-chain olefins having from 10 to 18 carbon atoms per molecule present in hydrocarbon mixtures obtained as products from the catalytic hydrogenation of oxides of carbon.

It is known that by treating straight-chain olefins with strong polybasic mineral acids, such as sulfuric acid, and then neutralizing the reaction product with an alkali, such as sodium hydroxide, compositions are obtained possessing useful detergent and wetting properties. For example, these detergents may be prepared by first polymerizing olefins having from 3 to 6 carbon atoms per molecule to obtain olefin polymers or co-polymers having from 10 to 30 carbon atoms per molecule, such as isobutylene dimer, trimer and tetramer, or dimers and trimers of amylene or hexylene. The polymerization of these olefins may be obtained in several ways, such as heating under suitable conditions of temperature and pressure, treating with varying concentrations of sulfuric acid or phosphoric acid, and also by means of catalysts such as chlorides of alumina or fluorides of boron or other volatile metallic halides. These polymerized olefins are next treated with relatively strong polybasic mineral acids, such as sulfuric acid, under conditions effective to form an olefin polymer reaction product of the acid, and are then neutralized with an alkali, such as sodium hydroxide or potassium hydroxide, to produce compositions having detergent and wetting properties.

In carrying out the aforementioned process, the resulting substantially simultaneous polymerization and depolymerization of the selected olefin, when treated with a mineral acid for conversion to its corresponding sulfonation product necessitates starting with a low molecular weight olefin having for example, approximately 3 or more carbon atoms per molecule, so that subsequent acid treatment will produce commercially marketable sulfonation products of the resulting olefin polymers which have approximately 10 or more carbon atoms per molecule. In instances where it is necessary or desirable to start with a straight-chain olefin having from 10 to 18 carbon atoms per molecule to produce commercially marketable detergent compositions, it is, therefore, necessary that resulting substantially simultaneous polymerization and depolymerization of the olefin be prevented. This has been found to be particularly desirable in preparing compositions having detergent and wetting properties, where the starting material comprises straight-chain olefins having from 10 to 18 carbon atoms per molecule present in hydrocarbon fractions obtained as products from the catalytic hydrogenation of oxides of carbon.

It has been found that commercially marketable detergent compositions may be prepared by first treating a straight-chain olefin having from 10 to 18 carbon atoms per molecule with an aqueous solution of a polybasic mineral acid having a concentration of at least 80%, such as sulfuric acid, at a temperature between about 0° C. and about −20° C. to convert the olefin to its corresponding sulfonation product. It has also been found that by carrying out the reaction under the aforementioned conditions of acid concentration and temperature range, substantially simultaneous polymerization and depolymerization of the olefin is prevented. The corresponding sulfonation product thus produced may be next treated with an alkali in quantities sufficient to produce a neutral alkyl salt having detergent and wetting properties.

From an economic viewpoint, it is highly desirable that the sulfonation product thus obtained be substantially acid-free in order to reduce the quantities of alkali otherwise required for the subsequent neutralization step, to produce a neutral alkyl salt suitable for use as a detergent composition. It has been found, however, that in obtaining the sulfonation product as a product of the aforementioned process, great difficulty is encountered in obtaining this product with a minimum of acid present. It has also been found that in instances where hydrocarbon mixtures, comprising $C_{10}$ to $C_{18}$ olefins and paraffins obtained as products from the catalytic hydrogenation of oxides of carbon, are reacted with the aforementioned aqueous solutions of polybasic mineral acids, quantitative reactions between olefins and acid to produce acid-free sulfonation products, are difficult to obtain unless extreme care is exercised in operation and in analytical computation of the quantities of the reactants employed.

It is, therefore, an object of the present invention to provide an improved process for preparing detergent compositions in the form of substantially acid-free sulfonation products from straight-chain olefins having from 10 to 18 carbon atoms per molecule.

Another object of the invention is to provide an improved process for preparing detergent compositions in the form of substantially acid-free sulfonation products from straight-chain olefins having from 10 to 18 carbon atoms per molecule present in hydrocarbon mixtures obtained as products from the catalytic hydrogenation of oxides of carbon.

Other objects and advantages inherent in the invention will be apparent from the following more detailed disclosure.

I have found that I may prepare commercially marketable detergent compositions from straight-chain olefins having from 10 to 18 carbon atoms per molecule, or from hydrocarbon fractions containing these olefins and paraffins, by employing a two-stage process for effecting the aforementioned reaction between these olefins and aqueous solutions of a polybasic mineral acid, to produce substantially acid-free sulfonation products, suitable for use in the manufacture of detergents, as a product of the process. In general, I contact a straight-chain olefin having from 10 to 18 carbon atoms per molecule and an aqueous solution of a polybasic mineral acid in a first reaction zone. The aqueous solution of the acid introduced into this zone has a concentration of at least 80% and is cooled, prior to its introduction into this zone, to a temperature between about 0° C. and about −20° C. In effecting the reaction between the olefin and the acid in this first reaction zone, I maintain at all times an excess of the olefin, so that substantially all of the acid present is reacted to form the corresponding sulfonation product of the olefin and without substantial simultaneous polymerization and depolymerization of the olefin taking place. Unreacted olefin present in this first reaction zone is next transferred to a second reaction zone, into which a fresh aqueous solution of the polybasic mineral acid is introduced. In this second reaction zone I maintain at all times an excess of the acid, so that substantially all of the unreacted olefin transferred from the first reaction zone is reacted to form its corresponding sulfonation product and without substantial polymerization and depolymerization of the olefin taking place. The resulting mixture, comprising the aforementioned sulfonation product and excess acid, is next transferred from this second reaction zone to the first reaction zone as the acid feed thereto. Sulfonation products of the olefin present in the first reaction zone, substantially acid-free, are then withdrawn from this zone as products of the process. If desired, this product may be further treated with an alkali to produce the corresponding metal alkyl sulfate, suitable for use as a commercially marketable detergent composition.

In another modification of the process of the invention, a hydrocarbon mixture obtained from the condensation of the reaction product produced in the catalytic hydrogenation of an oxide of carbon and comprising a straight-chain olefin having from 10 to 18 carbon atoms per molecule and a paraffin, is introduced into the above-mentioned first reaction zone, and is reacted with an aqueous solution of a polybasic mineral acid introduced under the aforementioned conditions of acid concentration and temperature range. An excess of the olefin is maintained at all times in this zone to effect complete reaction with substantially all of the acid present, to form the corresponding sulfonation product of the olefin without substantial simultaneous polymerization and depolymerization of the olefin taking place. Unreacted olefin and paraffin is transferred to the aforementioned second reaction zone into which a fresh aqueous solution of the acid is introduced. As before, an excess of the acid is maintained in this zone at all times so that substantially all of the previously unreacted olefin is reacted to form its corresponding sulfonation product and also without substantial simultaneous polymerization and depolymerization of the olefin taking place. The paraffin present in this zone is withdrawn, while the remaining mixture comprising the aforementioned sulfonation product and excess acid, is next transferred from this second reaction zone to the first reaction zone as the acid feed thereto, following which the sulfonation products of the olefin present in this zone, substantially acid-free, are withdrawn as products of the process.

The accompanying drawing, will serve to illustrate diagrammatically one form of the apparatus employed and capable of carrying out one specific embodiment of the process of the invention. However, it should be noted that it is not intended that the invention be limited to the embodiment illustrated, but is capable of other embodiments which may extend beyond the scope of the apparatus illustrated. Some of the mechanical elements necessary to effect the transfer of reactants and reaction products and to maintain the conditions necessary to carry out the function of the apparatus, are omitted in order to simplify the description. It will be understood, however, that much equipment of this nature is necessary and will be supplied by those skilled in the art.

Referring to the drawing, a hydrocarbon fraction obtained from the condensation of the reaction product produced in the catalytic hydrogenation of an oxide of carbon and comprising straight-chain olefins having from 10 to 18 carbon atoms per molecule and paraffins, is introduced through valved-line 10 into a suitable reaction vessel, represented by reactor 11. An aqueous solution of a polybasic mineral acid, having a concentration of at least 80%, is introduced through line 12 into a cooler 13. This acid may be sulfuric acid, as illustrated in the drawing, although other aqueous solutions of polybasic mineral acids within a similar concentration range may be employed, such as chlorosulfonic acid, fluorosulfonic acid and the like. In cooler 13, the acid is cooled to a temperature within the range between about 0° C. and about −20° C. and is transferred through line 14 to reactor 11. In reactor 11, the acid introduced through line 14 is maintained in such quantities that there is at all times present an excess of olefins over the quantities of introduced acid. In this reactor, the reactants may be stirred to effect complete reaction, resulting in the formation of the corresponding alkyl sulfates. After reaction has taken place, there are present in reactor 11, in addition to the formed alkyl sulfates, unreacted olefins and paraffins. These unreacted olefins and paraffins are next withdrawn from reactor 11 as an upper phase, through line 15 and transferred through this line to a second reaction vessel, represented in the drawing by reactor 16. A fresh aqueous solution of a polybasic mineral acid, (sulfuric acid, as illustrated in the drawing) having a concentration of at least 80%, is next introduced through valved-line 17 to a cooler 18. In cooler 18, the acid is cooled to a temperature within the range between about 0° C. and about −20° C. and is transferred through line 19 to reactor 16.

In reactor 16, the acid introduced through line 19 is maintained in such quantities that there is at all times present an excess of acid over the quantities of unreacted olefins introduced into reactor 16 through line 15. In this reactor the reactants may be stirred to effect complete reaction resulting in the formation of the corresponding alkyl sulfates. At this point, it should be noted that the inclusion of heat exchangers to operate with reactors 11 and 16 may be desirable to effect a reduction in any quantities of heat that may develop in these reactors. After the reaction has taken place, there are present in reactor 16, in addition to the formed alkyl sulfates, paraffins and excess acid. These paraffins are withdrawn as an upper phase through line 20 for further use outside the scope of the present process. The remaining mixture of alkyl sulfates and excess acid is withdrawn as a lower phase through line 12 and transferred through this line, through cooler 13, and into reactor 11, via line 14, as the acid feed thereto, for further use in the process described above. Initial quantities of acid required for starting the aforementioned reaction in reactor 11, are introduced into line 12 via valved-line 21. Alkyl sulfates in reactor 11, substantially acid-free, are withdrawn as a lower phase through valved-line 22, as a product of the process and may be further treated with an alkali such as sodium or potassium hydroxide to produce the corresponding metal alkyl sulfates, suitable for use as commercially marketable detergents.

It will be noted that in practicing the aforementioned embodiment of the invention, substantially complete quantitative reaction between olefin and acid, to produce acid-free alkyl sulfates, is easily obtained without the difficulties (such as constant chemical analysis of the olefin-containing hydrocarbon feed, or measurement of quantities of acid introduced) otherwise encountered when predetermined mixtures of olefins and acid are reacted to form the corresponding alkyl sulfates. The only degree of care required in practicing the process of the present invention, is merely to maintain an excess of olefin or acid in the aforementioned respective reaction zones, as described above, which can easily be effected by those skilled in the art.

The following specific examples will serve to illustrate the process of preparing the detergent composition of the present invention, but are not intended in any way to limit it. The apparatus exemplified by the drawing was used to carry out the processes of these examples.

*Example I*

A hydrocarbon fraction, obtained from the catalytic hydrogenation of carbon monoxide, having a boiling range between about 150° C. and about 225° C. and containing approximately 25% by weight of olefins having an average molecular weight of 170, was introduced at a low point into reactor 11. This hydrocarbon mixture was contacted in reactor 11 with 10% of its weight of 85% sulfuric acid for starting-up purposes, which had previously been cooled to −20° C. in cooler 13. This reactor was equipped with cooling coils and with mechanical stirrers to insure complete admixture of the components. The temperature of reactor 11 was kept between about −10° C. and about 0° C., and the rate of flow of the hydrocarbon-feed was so adjusted that samples taken from the bottom of reactor 11, showed no or only traces of free sulfuric acid. The upper phase from reactor 11, comprising paraffins and unreacted olefins was passed overhead through line 15 to a low point in reactor 16. This reactor was equipped with cooling coils and mechanical stirrers, and was also kept at a temperature between about −10° C. and about 0° C. At an upper point of this reactor, a fresh stream of 85% sulfuric acid, cooled to −20° C., was introduced. The amount of sulfuric acid thus introduced into reactor 16 was slightly in excess of the theoretical amount of acid necessary to sulfate all the olefins present in the original feed. The bottom phase from reactor 16, comprising the formed alkyl sulfonation product and excess sulfuric acid was cooled and returned to reactor 11. The effluent paraffin stream from reactor 16 was found to contain approximately 1 to 3% olefins, while the sulfonation product withdrawn as bottoms from reactor 11, was found to be substantially acid-free, and upon subsequent treatment with sodium hydroxide, yielded a commercially marketable composition having excellent detergent and wetting properties.

*Example II*

The process of Example I was repeated, except that a hydrocarbon fraction having a boiling range between about 150° C. and about 250° C., and containing about 50% olefins by weight, was employed. The acid employed was 90% sulfuric acid. It was found that the effluent paraffin stream from reactor 16 contained approximately 1 to 2% olefins, while the sulfonation product withdrawn from reactor 11, upon subsequent neutralization with sodium hydroxide, yielded a commercially marketable detergent composition, similar to that obtained in Example I.

Having thus described my invention, what I claim and desire to secure by Letters Patent is:

1. The process of preparing a sulfonation product which comprises introducing a straight-chain olefin having from 10 to 18 carbon atoms per molecule and an aqueous solution of a sulfur containing polybasic mineral acid into a first reaction zone, maintaining an excess of olefin in said first reaction zone over the quantity necessary to react with substantially all of the acid present whereby the resulting product is a mixture comprising the corresponding sulfonation product of said olefin and unreacted olefin, passing a mixture comprising unreacted olefin from said first reaction zone to a second reaction zone, introducing a fresh aqueous solution of said polybasic mineral acid into said second reaction zone, maintaining an excess of acid in said second reaction zone over the quantity necessary to react with substantially all of unreacted olefin present in the mixture introduced into said second reaction zone whereby the resulting product is a mixture comprising the corresponding sulfonation product of said olefin and unreacted acid, maintaining the aqueous solutions of acid introduced into said reaction zones at a concentration of at least 80% and introducing said aqueous acid solutions at a temperature between about 0° C. and about −20° C., passing said last-mentioned mixture from said second reaction zone to said first reaction zone as a feed thereto, and withdrawing the sulfonation product from said first reaction zone as a product of the process.

2. A process in accordance with claim 1 wherein said polybasic mineral acid is sulfuric acid.

3. A process in accordance with claim 1 wherein said polybasic mineral acid is fluorosulfonic acid.

4. A process in accordance with claim 1 wherein said polybasic mineral acid is chlorosulfonic acid.

5. The process of preparing a sulfonation product which comprises introducing a hydrocarbon mixture comprising a straight-chain olefin having from 10 to 18 carbon atoms per molecule and a paraffin and an aqueous solution of a sulfur-containing polybasic mineral acid into a first reaction zone, maintaining an excess of olefin in said first reaction zone over the quantity necessary to react with substantially all of the acid present whereby the resulting product is a mixture comprising the corresponding sulfonation product of said olefin, unreacted olefin and paraffin, passing a mixture comprising unreacted olefin and paraffin from said first reaction zone to a second reaction zone, introducing a fresh aqueous solution of said polybasic mineral acid into said second reaction zone, maintaining an excess of acid in said second reaction zone over the quantity necessary to react with substantially all of unreacted olefin present in the mixture introduced into said second reaction zone whereby the resulting product is a mixture comprising the corresponding sulfonation product of said olefin, unreacted acid and paraffin, maintaining the aqueous solutions of acid introduced into said reaction zones at a concentration of at least 80% and introducing said aqueous acid solutions at a temperature between about 0° C. and about −20° C., withdrawing paraffin from said last-mentioned mixture produced in said second reaction zone, passing the remainder of said last-mentioned mixture from said second reaction zone to said first reaction zone as a feed thereto, and withdrawing the sulfonation product from said first reaction zone as a product of the process.

6. A process in accordance with claim 9 wherein said polybasic mineral acid is sulfuric acid.

7. A process in accordance with claim 9 wherein said polybasic mineral acid is fluorosulfonic acid.

8. A process in accordance with claim 9 wherein said polybasic mineral acid is chlorosulfonic acid.

9. The process of preparing a sulfonation product which comprises introducing a straight-chain olefin having from 10 to 18 carbon atoms per molecule and an aqueous solution of a sulfur-containing polybasic mineral acid selected from the group consisting of sulfuric acid, fluorosulfonic acid and chlorosulfonic acid into a first reaction zone, maintaining an excess of olefin in said first reaction zone over the quantity necessary to react with substantially all of the acid present whereby the resulting product is a mixture comprising the corresponding sulfonation product of said olefin and unreacted olefin, passing a mixture comprising unreacted olefin from said first reaction zone to a second reaction zone, introducing a fresh aqueous solution of said polybasic mineral acid into said second reaction zone, maintaining an excess of acid in said second reaction zone over the quantity necessary to react with substantially all of unreacted olefin present in the mixture introduced into said second reaction zone whereby the resulting product is a mixture comprising the corresponding sulfonation product of said olefin and unreacted acid, maintaining the aqueous solutions of acid introduced into said reaction zones at a concentration of at least 80% and introducing said aqueous acid solutions at a temperature between about 0° C. and about −20° C., passing said last-mentioned mixture from said second reaction zone to said first reaction zone as a feed thereto, and withdrawing the sulfonation product from said first reaction zone as a product of the process.

10. The process of preparing a sulfonation product which comprises introducing a hydrocarbon mixture comprising a straight-chain olefin having from 10 to 18 carbon atoms per molecule and a paraffin and an aqueous solution of a sulfur-containing polybasic mineral acid selected from the group consisting of sulfuric acid, fluorosulfonic acid and chlorosulfonic acid into a first reaction zone, maintaining an excess of olefin in first reaction zone over the quantity necessary to react with substantially all of the acid present whereby the resulting product is a mixture comprising the corresponding sulfonation product of said olefin, unreacted olefin and paraffin, passing a mixture comprising unreacted olefin and paraffin from said first reaction zone to a second reaction zone, introducing a fresh aqueous solution of said polybasic mineral acid into said second reaction zone, maintaining an excess of acid in said second reaction zone over the quantity necessary to react with substantially all of unreacted olefin present in the mixture introduced into said second reaction zone whereby the resulting product is a mixture comprising the corresponding sulfonation product of said olefin, unreacted acid and paraffin, maintaining the aqueous solutions of acid introduced into said reaction zones at a concentration of at least 80% and introducing said aqueous acid solutions at a temperature between about 0° C. and about −20° C., withdrawing paraffin from said last-mentioned mixture produced in said second reaction zone, passing the remainder of said last-mentioned mixture from said second reaction zone to said first reaction zone as a feed thereto, and withdrawing the sulfonation product from said first reaction zone as a product of the process.

LOUIS C. RUBIN.

REFERENCES CITED

The following references are of record in the file of this patent:

UNITED STATES PATENTS

| Number | Name | Date |
|---|---|---|
| 2,027,896 | Bertsch | Jan. 14, 1936 |
| 2,061,617 | Downing | Nov. 24, 1936 |
| 2,265,993 | Beckham | Dec. 16, 1941 |
| 2,285,390 | Brandt | June 9, 1942 |
| 2,433,396 | Proell | Dec. 30, 1947 |